Oct. 2, 1934.    R. B. WORDEN    1,975,218
FISH LURE
Filed Dec. 23, 1932

R. B. Worden, Inventor

By Watson E. Coleman, Attorney

Patented Oct. 2, 1934

1,975,218

UNITED STATES PATENT OFFICE 1,975,218

FISH LURE

R. B. Worden, Granger, Wash.

Application December 23, 1932, Serial No. 648,663

1 Claim. (Cl. 43—47)

This invention relates to fish lures, and more particularly to a lure constructed to simulate a fly or other insect.

An object of this invention is to provide a fish lure which is buoyant and which is so constructed that the movement of the fly relative to the water will cause the fly or lure to rotate or whirl in the water.

Another object of this invention is to provide a lure of this kind which is so constructed that it will rotate when it is being cast and before striking the water so that it will simulate the struggling of a fly or insect both before and after it strikes the water.

A further object of this invention is to provide a lure of this kind which is so constructed that it will not twist or unwind the fish line being swivelly mounted on the stem of a hook.

A still further object of this invention is to provide a lure which can be used with a sinker or the like and which is so constructed that it will not tangle in objects resting on the bottom of the stream or body of water due to the buoyancy of the lure.

Other objects will be apparent from the accompanying description and the drawing wherein.

Figure 1:
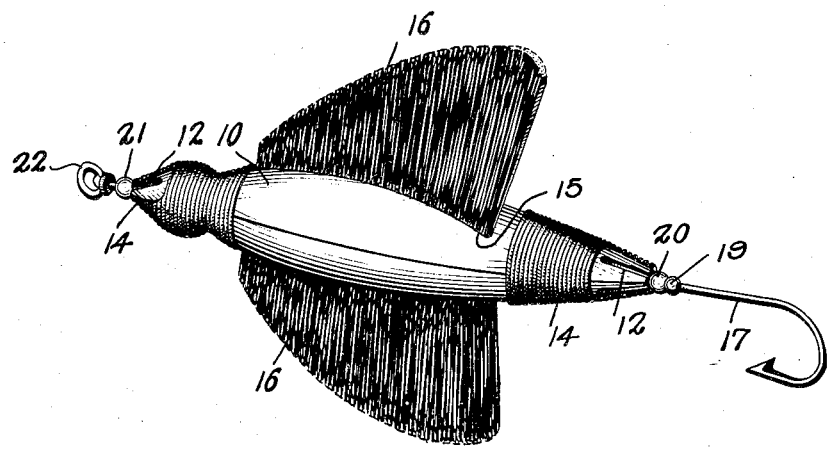
Figure 1 is a detail perspective view partly broken away of a lure constructed according to the preferred embodiment of this invention.
Figure 2:
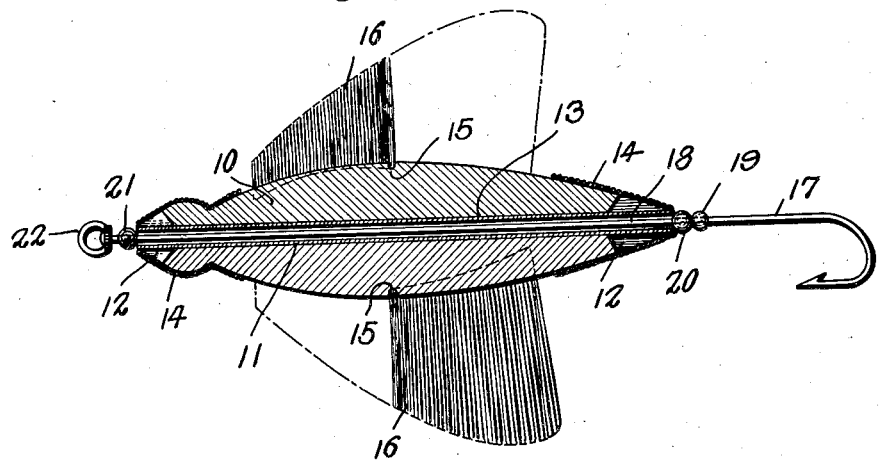
Figure 2 is a longitudinal section partly in detail taken substantially through the longitudinal center of the lure.

Referring to the drawing wherein like numerals of reference designate corresponding parts throughout the several views, the numeral 10 designates generally the body of a lure constructed in the form of the body of an insect or fly which is provided with a bore 13 extending longitudinally and centrally therethrough within which a metal tube 11 or the like is disposed.

This body 10 may be constructed of one or more parts, being split longitudinally and provided with slits 12 at each end, which slits provide means whereby, upon wrapping of the ends of the body as with a binding 14, the ends of the body will be contracted and will clamp the periphery of the metal tube 11. The body 10 is provided intermediate the ends thereof with an elongated slit or cut 15, which slit may be disposed in alinement with the tube 11, or may be disposed on a curvature so that when a wing member 16 is secured in the slit 15, the body 10 will either assume a stationary position or will flutter or whirl in the water as either the water or the fly is moved one relative to the other.

These wings 16 are disposed one on each side of the body 10 and, if desired, additional wings may be mounted on the body 10 so as to accomplish the desired movement of the body relative to the water. These wings 16 may be constructed of a feather or closely positioned hairs or other light material of the desired color and construction so as to simulate the outstretched wings of the insect which it is desired to simulate.

A hook, generally designated as 17, has the elongated shank 18 thereof loosely positioned within the tube 11, so that the body 10 will be rotatable relative to this shank 18, and a fixed bead or stop member 19 is mounted on the shank 18 in the desired position, and a bead 20 is loosely positioned on the shank 18 and engages against the fixed bead or stop member 19. The tube 11 also engages against this rotatable bead 20 so that the body 10 will readily rotate relative to the shank 18. This bead 19 is preferably positioned at the rear of the body 10, while the forward end of the shank 18 is provided with a bead 21 which is fixed relative to the shank 18 and holds the body 10 against longitudinal movement on the shank 18 while permitting free rotation thereof. An eye or loop 22 is swivelly mounted on the forward end of the shank 18, and this eye or swivel may be attached to a line or other attaching means.

In the use of this lure, the fish line may be attached to the swivel 22 and the fly cast in the usual manner, and due to the mounting of the wings 16 as the fly is being cast, it will assume a fluttering or whirling movement, so as to attract any fish which might be relatively close to the surface.

After striking the water, the lure will float on the top of the water due to the buoyancy of the body 10 and if it is desired to have the body submerged, a sinker of desired weight can be attached to the line in the usual manner. The wings 16, where more than two wings are used, will have a tendency to keep any grass or other snags away from the hook 17, so that the fly or lure can be freely moved through the water.

It is, of course, understood that the body 10 may be colored to simulate the fly or insect which it is desired to duplicate. Due to the rotatable mounting of the body 10 relative to the shank 18, the line attached to the swivel 22 will not be wound or twisted during the movement of the fly through the water. Where it is desired to totally submerge the lure in the water, a sinker or other weight may be attached to the line, and due to the buoyancy of the body 10, the lure will at all times be positioned above the bottom of the water.

This lure may be colored as by painting, enamelling or the like, any desired color so as to simulate as closely as possible the fly or insect after which the lure has been designed.

What is claimed is:—

A fish lure comprising a buoyant body split longitudinally into a plurality of body sections simulating the body of an insect each section having split opposite end portions, a metal tube open at each end extending longitudinally through the center of the body, a wrapping engaging about the body sections adjacent each end thereof to hold the body sections together and about the tube, said wrapping also compressing the split end portions to hold the body sections tight about the tube, a pair of grooves formed in the body, a wing in each groove intermediate the wrapped portions of the body and disposed on an angle to the length of the body to cause the body to rotate on movement thereof relative to the water, a hook having an elongated stem loosely positioned in the tube, a bead fixedly carried by the stem adjacent one end thereof, a rotatable bead mounted on the stem engaging the fixed bead and engaging one end of the tube, a second rotatable bead adjacent the opposite end of the stem and engaging against the opposite end of the tube, and swivel means engaging the opposite end of the stem.

R. B. WORDEN.